United States Patent
Yanagi et al.

(10) Patent No.: US 11,468,692 B2
(45) Date of Patent: *Oct. 11, 2022

(54) CONTROL DEVICE, VEHICLE, IMAGE DISPLAY SYSTEM, AND IMAGE DISPLAY METHOD

(71) Applicant: TOYOTA JIDOSHA KABUSHIKI KAISHA, Toyota (JP)

(72) Inventors: Takuro Yanagi, Toyota (JP); Maki Tamura, Nisshin (JP); Mutsumi Matsuura, Okazaki (JP); Toshihiko Inoue, Toyota (JP); Naoki Yamamuro, Nagoya (JP); Takashi Hayashi, Aichi-gun (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,687

(22) Filed: Oct. 14, 2019

(65) Prior Publication Data

US 2020/0202150 A1 Jun. 25, 2020

(30) Foreign Application Priority Data

Dec. 21, 2018 (JP) .............................. JP2018-240111

(51) Int. Cl.
*G01C 21/26* (2006.01)
*H04N 5/44* (2011.01)
(Continued)

(52) U.S. Cl.
CPC .............. *G06V 20/597* (2022.01); *B60R 1/00* (2013.01); *G01C 21/265* (2013.01); *H04N 5/44* (2013.01)

(58) Field of Classification Search
CPC . G06T 7/70; H04N 5/225; B60W 2554/4047; B60W 40/08; B60W 50/14;
(Continued)

(56) References Cited

U.S. PATENT DOCUMENTS 7,986,339 B2 7/2011 Higgins
9,269,267 B2 2/2016 Goodwin
(Continued)

FOREIGN PATENT DOCUMENTS

CN 106796755 A 5/2017
CN 108369780 A 8/2018
(Continued)

OTHER PUBLICATIONS

Office Action dated Jul. 20, 2020 in co-pending U.S. Appl. No. 16/690,230, 6 pages.
(Continued)

*Primary Examiner* — Paulos M Natnael
(74) *Attorney, Agent, or Firm* — Oblon, McClelland, Maier & Neustadt, L.L.P.

(57) ABSTRACT

A control device includes a controller. The controller detects, as an event, that a target present outside a vehicle has been overlooked by a driver of the vehicle during. The controller controls the outputting of a target image, which is an image including the target overlooked in the detected event, toward the driver.

11 Claims, 4 Drawing Sheets

(51) Int. Cl.
 *B60R 1/00* (2022.01)
 *G06V 20/59* (2022.01)
 *G06K 9/00* (2022.01)

(58) Field of Classification Search
 CPC .. G08G 1/0104; B60R 1/025; G06K 9/00597; G06K 9/00845; G06K 9/00939
 See application file for complete search history.

(56) References Cited

U.S. PATENT DOCUMENTS

| | | | |
|---|---|---|---|
| 9,586,591 B1* | 3/2017 | Fields | B60W 40/09 |
| 9,888,105 B2 | 2/2018 | Rhoads | |
| 9,952,051 B2 | 4/2018 | Kim et al. | |
| 10,471,955 B2 | 11/2019 | Kouri et al. | |
| 2001/0041962 A1 | 11/2001 | Sugawara et al. | |
| 2003/0169906 A1 | 9/2003 | Gokturk et al. | |
| 2012/0197522 A1* | 8/2012 | Fukuhara | G01C 21/3484 701/424 |
| 2014/0272810 A1* | 9/2014 | Fields | G09B 9/052 434/65 |
| 2017/0031530 A1* | 2/2017 | Ikeda | H04N 9/3179 |
| 2017/0038892 A1* | 2/2017 | Ikeda | G06F 3/04883 |
| 2017/0039030 A1* | 2/2017 | Ikeda | G06F 3/0416 |
| 2017/0041581 A1* | 2/2017 | Ikeda | G09G 5/363 |
| 2017/0166122 A1* | 6/2017 | Ando | B60Q 9/00 |
| 2017/0199043 A1 | 7/2017 | Chen | |
| 2018/0025636 A1 | 1/2018 | Boykin et al. | |
| 2018/0362053 A1* | 12/2018 | Isa | G02B 27/0093 |
| 2020/0068127 A1* | 2/2020 | Au | G06F 21/85 |

FOREIGN PATENT DOCUMENTS

| | | |
|---|---|---|
| JP | 2001-317956 A | 11/2001 |
| JP | 2006-172215 A | 6/2006 |
| JP | 2007-225282 A | 9/2007 |
| JP | 2007-318431 A | 12/2007 |
| JP | 2008-64483 A | 3/2008 |
| JP | 2014-074626 A | 4/2014 |
| JP | 2018-101337 A | 6/2018 |
| WO | WO 2015/071924 A1 | 5/2015 |
| WO | 2016/056162 A1 | 4/2016 |

OTHER PUBLICATIONS

U.S. Office Action dated Dec. 1, 2020 in U.S. Appl. No. 16/690,230, First Named Inventor Takuro Yanagi (18 pages).
Advisory Action dated Jul. 1, 2021 in U.S. Appl. No. 16/690,230, First Named Inventor Takuro Yanagi (6 pages).
U.S. Final Office Action dated Apr. 15, 2021 in U.S. Appl. No. 16/690,230, First Named Inventor Takuro Yanagi (20 pages).

* cited by examiner

CONTROL DEVICE, VEHICLE, IMAGE DISPLAY SYSTEM, AND IMAGE DISPLAY METHOD

INCORPORATION BY REFERENCE

The disclosure of Japanese Patent Application No. 2018-240111 filed on Dec. 21, 2018 including the specification, drawings and abstract is incorporated herein by reference in its entirety.

BACKGROUND

1. Technical Field

The present disclosure relates to a control device, a vehicle, an image display system, and an image display method.

2. Description of Related Art

A technique, in which a video displayed on a display screen of a television is recorded in an image recording unit such that a viewer can view the video later in a case where the video is overlooked by the viewer looking away, is described in Japanese Unexamined Patent Application Publication No. 2007-318431 (JP 2007-318431 A).

SUMMARY

When a driver passes by a place such as a store or a fixed object such as a signboard during driving or when the driver and a moving object such as a person or an automobile pass by each other, the driver may overlook the place, the object, or the person and may become curious about the place, the object, or the person later. As a result, the driver may lose concentration, which may interfere with safe driving.

The technique described in JP 2007-318431 A is to be applied to a case where a viewer of a television overlooks a video and the technique cannot be applied to a case where a driver overlooks a target such as a place, an object, or a person while driving.

The present disclosure provides a control device, a vehicle, an image display system, and an image display method with which it is possible for a driver to check later a target overlooked during driving.

A first aspect of the present disclosure relates to a control device including a controller. The controller is configured to detect, as an event, that a target present outside a vehicle has been overlooked by a driver of the vehicle during driving and to control the outputting of a target image, which is an image including the target overlooked in the detected event, toward the driver.

A second aspect of the present disclosure relates to an image display method. The image display method includes detecting, as an event, that a target present outside a vehicle has been overlooked by a driver of the vehicle during driving by a control device, capturing a target image, which is an image including the target overlooked in the event detected by the control device by an imaging unit of the vehicle, and displaying the target image captured by the imaging unit toward the driver by any of an output unit of the vehicle and a terminal device.

According to the aspects of the present disclosure, it is possible for a driver to check later a target overlooked during driving.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to drawings.

In the drawings, the same or corresponding parts are given the same reference numerals. In the description of the present embodiment, description of the same or corresponding parts will be appropriately omitted or simplified.

Figure 1:
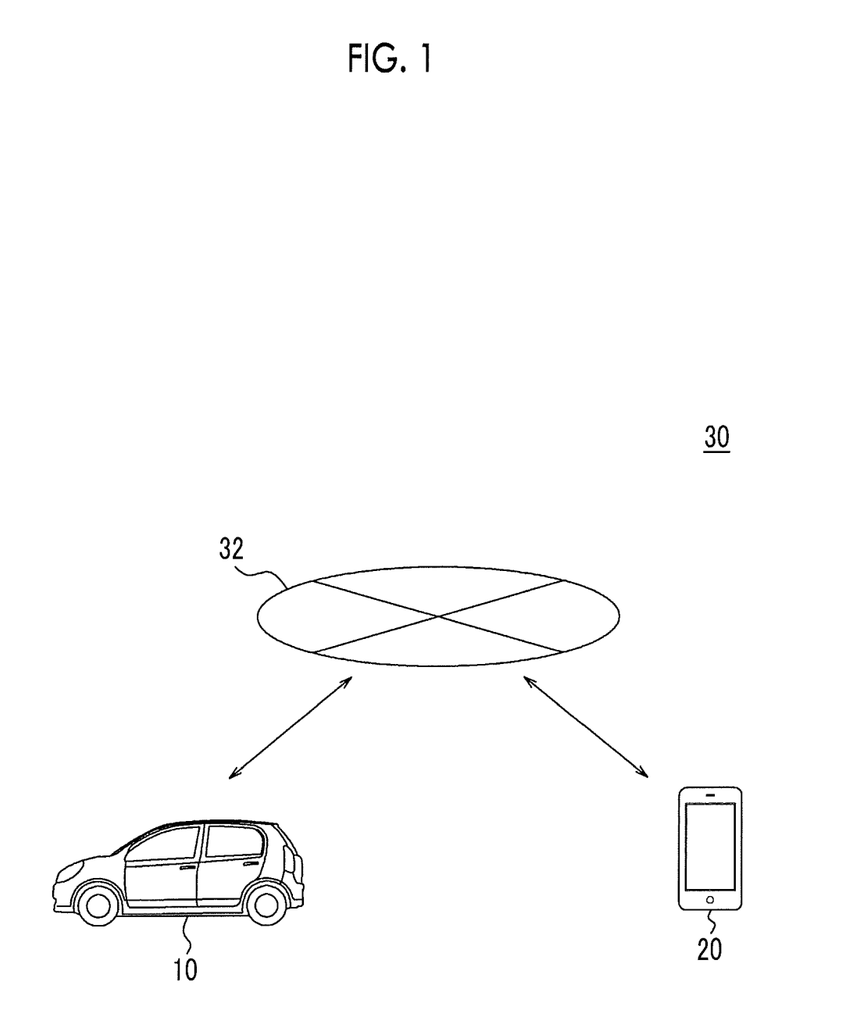
FIG. 1 is a schematic diagram illustrating the configuration of an image display system according to an embodiment of the present disclosure.
Figure 2:
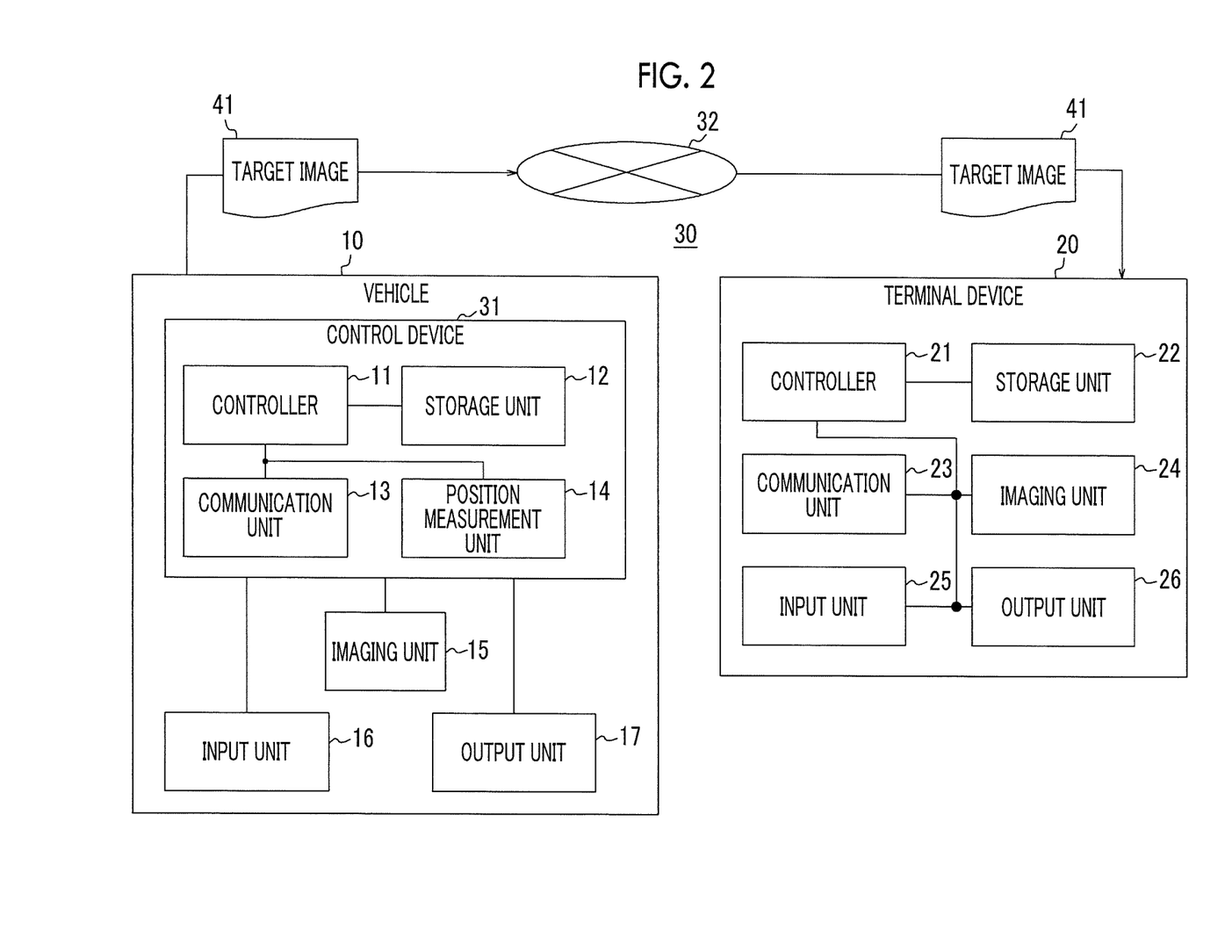
FIG. 2 is a block diagram illustrating the configuration of an image display system according to the embodiment of the present disclosure.

The outline of the present embodiment will be described with reference to FIGS. 1 and 2.

A control device 31 detects, as an event, that a target present outside a vehicle 10 has been overlooked by a driver of the vehicle 10 during driving. An imaging unit 15 of the vehicle 10 captures a target image 41, which is an image including a target overlooked in the event detected by the control device 31. An output unit 17 of the vehicle 10 displays the target image 41 captured by the imaging unit 15 toward the driver of the vehicle 10. Alternatively, a terminal device 20 displays the target image 41 captured by the imaging unit 15 of the vehicle 10 toward the driver of the vehicle 10.

The driver of the vehicle 10 can check an overlooked target later by viewing the target image 41 displayed on any of the output unit 17 of the vehicle 10 or the terminal device 20 even in a case where the driver overlooks a target such as a place, an object, or a person during driving. Therefore, according to the present embodiment, the driver can maintain concentration without being curious about a target overlooked during driving. As a result, the safety of driving is improved.

The target image 41 may be an image in which a target overlooked by the driver of the vehicle 10 is put up solely or an image including the vicinity of the target. The target image 41 may be a moving image including at least one frame in which a target overlooked by the driver of the vehicle 10 is shown or a stationary image in which the target is shown. In the present embodiment, the target image 41 is an image captured by the vehicle 10. However, the target image 41 may be an image captured by another vehicle such as a vehicle following the vehicle 10. In a case where the target image 41 is an image captured by a vehicle different from the vehicle 10, the control device 31 may acquire the target image 41 through inter-vehicle communication, road-vehicle-communication, or communication performed via a network 32.

In the present embodiment, the vehicle 10 is an automobile. However, the vehicle 10 may be another type of vehicle.

The configuration of an image display system 30 according to the present embodiment will be described with reference to FIG. 2.

The image display system 30 is provided with the control device 31 and the terminal device 20. In a case where the output unit 17 of the vehicle 10 displays the target image 41, the terminal device 20 may be omitted.

The control device 31 is provided in the vehicle 10. The control device 31 may be configured as a vehicle-mounted machine such as a navigation device and may be configured as an electronic machine such as a smartphone that is used while being connected to a vehicle-mounted machine.

The control device 31 is provided with constituent elements such as a controller 11, a storage unit 12, a communication unit 13, and a position measurement unit 14.

The controller 11 is one or more processors. As the processor, a general-purpose processor such as a CPU or a dedicated processor dedicated for a specific process can be used. The "CPU" is an abbreviation of "central processing unit". One or more dedicated circuits may be included in the controller 11 or one or more dedicated circuits may be substituted for one or more processors in the controller 11. As the dedicated circuit, for example, an FPGA or an ASIC can be used. The "FPGA" is an abbreviation of "field-programmable gate array". The "ASIC" is an abbreviation of "application specific integrated circuit". One or more ECUs may be included in the controller 11. The "ECU" is an abbreviation of "electronic control unit". The controller 11 performs information processing relating to the operation of the control device 31 while controlling each part of the vehicle 10 including the control device 31.

The storage unit 12 is one or more memories. As the memory, for example, a semiconductor memory, a magnetic memory, or an optical memory can be used. The memory may function as a main storage device, an auxiliary storage device, or a cache memory. The storage unit 12 stores information used for the operation of the control device 31 and information acquired through the operation of the control device 31.

The communication unit 13 is one or more communication modules. As the communication module, for example, a communication module conforming to DSRC, LTE, 4G, or 5G can be used. The "DSRC" is an abbreviation of "dedicated short range communication". The "LTE" is an abbreviation of "long term evolution". The "4G" is an abbreviation of "4th generation". The "5G" is an abbreviation of "5th generation". The communication module has a communication function. The communication unit 13 receives information used for the operation of the control device 31 and transmits information acquired through the operation of the control device 31.

The position measurement unit 14 is one or more position measurement modules. As the position measurement module, for example, a position measurement module conforming to a GPS, a QZSS, a GLONASS, or Galileo can be used. The "GPS" is an abbreviation of "global positioning system". The "QZSS" is an abbreviation of "quasi-zenith satellite system". A satellite in the QZSS is called "quasi-zenith satellite". The "GLONASS" is an abbreviation of "global navigation satellite system". The position measurement unit 14 acquires information about the position of the vehicle 10.

The functions of the control device 31 are realized when a control program according to the present embodiment is executed by a processor included in the controller 11. That is, the functions of the control device 31 are realized by means of software. The control program is a program causing a computer to perform processes in steps included in the operation of the control device 31 such that functions corresponding to the processes in the steps are realized by the computer. That is, the control program is a program causing the computer to function as the control device 31.

The program can be recorded in a computer-readable recording medium. As the computer-readable recording medium, for example, a magneto recording device, an optical disc, a magneto-optical recording medium, or a semiconductor memory can be used. Distribution of the program is performed, for example, by selling, handing over, or lending a portable recording medium such as a DVD or a CD-ROM with the program recorded therein. The "DVD" is an abbreviation of "digital versatile disc". The "CD-ROM" is an abbreviation of "compact disc read only memory". Distribution of the program may be performed by storing the program in a storage of a server and transferring the program to another computer from the server via a network. The program may be provided as a program product.

The computer temporarily stores, in a memory, the program recorded in the portable recording medium or the program transferred from the server. Then, the computer reads the program stored in the memory with a processor and performs a process in accordance with the read program by means of the processor. The computer may perform a process in accordance with the program by directly reading the program from the portable recording medium. The computer may perform a process in accordance with a received program each time when the program is transferred to the computer from the server. The process may be performed by means of a so-called ASP type service in which no program is transferred from the server to the computer and functions are realized by execution instructions and result acquisition solely. The "ASP" is an abbreviation of "application service provider". The program includes information that is to be provided for a process performed by an electronic computer and is equivalent to a program. For example, data defining a process in the computer, which is not a direct command with respect to the computer, corresponds to the "information equivalent to a program".

A part or all of the functions of the control device 31 may be realized by means of the dedicated circuit included in the controller 11. That is, a part or all of the functions of the control device 31 may be realized by means of a hardware.

The vehicle 10 is provided with the imaging unit 15, an input unit 16, and the output unit 17 in addition to the control device 31. In the vehicle 10, the imaging unit 15, the input unit 16, and the output unit 17 may be a part of the control device 31.

The imaging unit 15 is one or more vehicle-mounted cameras. As the vehicle-mounted camera, for example, a front camera, a side camera, a rear camera, or an in-vehicle camera can be used. The imaging unit 15 captures an image from the vehicle 10. That is, the imaging unit 15 captures an image of the outside of the vehicle 10. The imaging unit 15 also captures an image of the inside of the vehicle 10 such as an image of a driver's seat, an assistant driver's seat, or a back seat in the vehicle 10.

The input unit 16 is one or more input interfaces. As the input interface, for example, a physical key, a capacitive key, a pointing device, a touch screen integrally provided with a vehicle-mounted display, or a vehicle-mounted microphone can be used. The input unit 16 receives input of information used for the operation of the control device 31 from a user such as the driver of the vehicle 10.

The output unit 17 is one or more output interfaces. As the output interface, for example, a vehicle-mounted display or a vehicle-mounted speaker can be used. As the vehicle-mounted display, for example, an HUD, an LCD, or an organic EL display can be used. The "HUD" is an abbreviation of "head-up display". The "LCD" is an abbreviation of "liquid crystal display". The "EL" is an abbreviation of "electro luminescence". The vehicle-mounted display has a display function. The output unit 17 outputs information acquired through the operation of the control device 31 toward the user.

The terminal device 20 is a machine that is used by the driver of the vehicle 10. The terminal device 20 may be configured as a mobile machine such as a smartphone carried by the driver of the vehicle 10 and may be configured as a non-mobile machine such as a desktop PC that is used by the driver of the vehicle 10 in the driver's house or an office. The "PC" is an abbreviation of "personal computer".

The terminal device 20 is provided with constituent elements such as a controller 21, a storage unit 22, a communication unit 23, an imaging unit 24, an input unit 25, and an output unit 26.

The controller 21 is one or more processors. As the processor, a general-purpose processor such as a CPU or a dedicated processor dedicated for a specific process can be used. One or more dedicated circuits may be included in the controller 21 or one or more dedicated circuits may be substituted for one or more processors in the controller 21. As the dedicated circuit, for example, an FPGA or an ASIC can be used. The controller 21 performs information processing relating to the operation of the terminal device 20 while controlling each part of the terminal device 20.

The storage unit 22 is one or more memories. As the memory, for example, a semiconductor memory, a magnetic memory, and an optical memory can be used. The memory may function as a main storage device, an auxiliary storage device, or a cache memory. The storage unit 22 stores information used for the operation of the terminal device 20 and information acquired through the operation of the terminal device 20.

The communication unit 23 is one or more communication modules. As the communication module, for example, a communication module conforming to DSRC, LTE, 4G, 5G, or a LAN standard can be used. The "LAN" is an abbreviation of "local area network". The communication unit 23 receives information used for the operation of the terminal device 20 and transmits information acquired through the operation of the terminal device 20.

The imaging unit 24 is one or more cameras. The imaging unit 24 captures an image.

The input unit 25 is one or more input interfaces. As the input interface, for example, a physical key, a capacitive key, a pointing device, a touch screen integrally provided with a vehicle-mounted display, or a microphone can be used. The input unit 25 receives input of information used for the operation of the terminal device 20 from a user such as the driver of the vehicle 10.

The output unit 26 is one or more output interfaces. As the output interface, for example, a display or a speaker can be used. As the display, for example, an LCD or an organic EL display can be used. The display has a display function. The output unit 26 outputs information acquired through the operation of the terminal device 20 toward a user.

The functions of the terminal device 20 are realized when a terminal program according to the present embodiment is executed by a processor included in the controller 21. That is, the functions of the terminal device 20 are realized by means of software. The terminal program is a program causing a computer to perform processes in steps included in the operation of the terminal device 20 such that functions corresponding to the processes in the steps are realized by the computer. That is, the terminal program is a program causing the computer to function as the terminal device 20.

A part or all of the functions of the terminal device 20 may be realized by means of the dedicated circuit included in the controller 21. That is, a part or all of the functions of the terminal device 20 may be realized by means of a hardware.

The operation of the image display system 30 according to the present embodiment will be described with reference to FIGS. 3 and 4 in addition to FIG. 2. The operation of the image display system 30 corresponds to an image display method according to the present embodiment.

Figure 3:
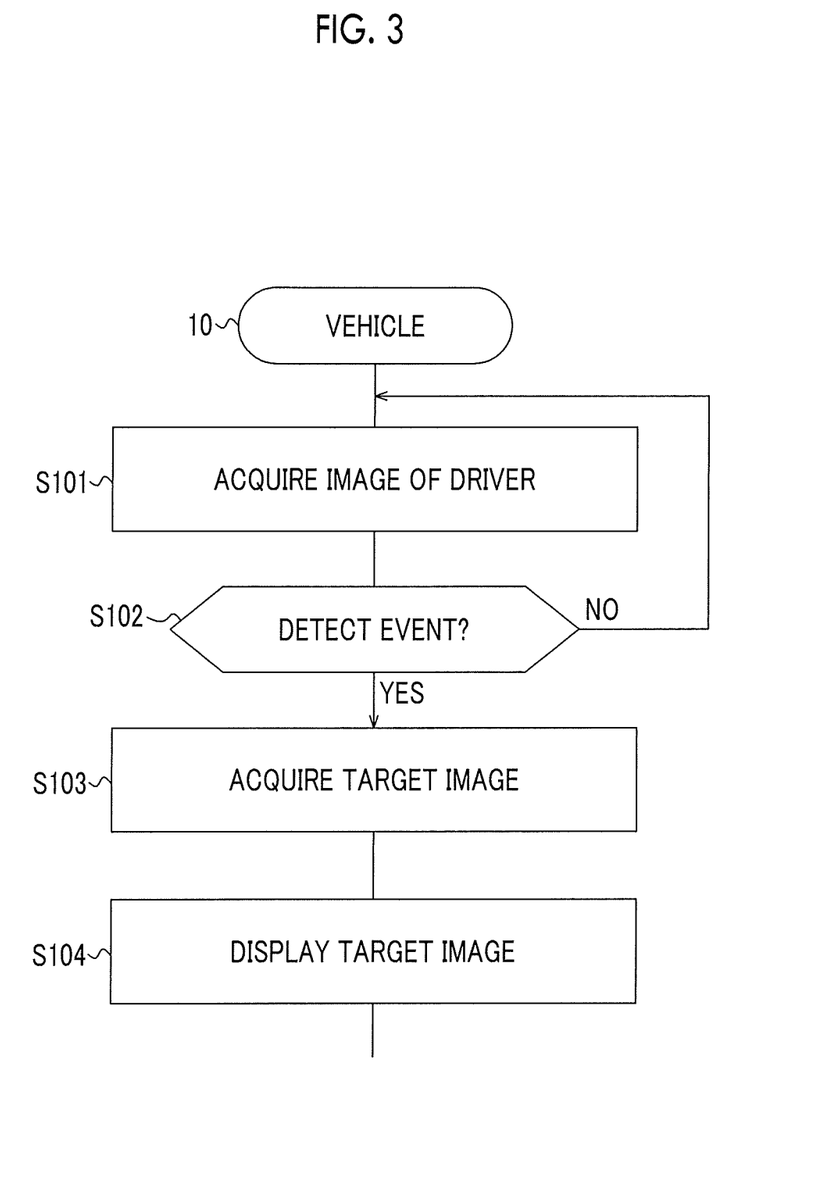
FIG. 3 is a flowchart illustrating an operation of the image display system according to the embodiment of the present disclosure.

FIG. 3 illustrates the operation of the image display system 30 in a case where the output unit 17 of the vehicle 10 displays the target image 41.

Processes in step S101 to S104 are performed in the vehicle 10.

In step S101, the controller 11 of the control device 31 acquires an image of the driver of the vehicle 10.

Specifically, the controller 11 acquires, from the imaging unit 15, an image including the head and the eyes of the driver of the vehicle 10 such as an image of a driver's seat of the vehicle 10. The controller 11 stores the acquired image in the storage unit 12.

In step S102, the controller 11 detects, as an event, that a target present outside the vehicle 10 has been overlooked by the driver of the vehicle 10 during driving.

In the present embodiment, the controller 11 detects the event from the image including the driver of the vehicle 10 which is acquired in step S101 and is captured in the vehicle 10.

Specifically, the controller 11 analyzes the image of the driver stored in the storage unit 12 to calculate a line-of-sight direction of the driver of the vehicle 10. As a technique of calculating a line-of-sight direction from an image including the head and the eyes of a person, a random related art can be used. The controller 11 calculates the track of a line of sight by using a combination of the result of latest line-of-sight direction calculation and the result of the line-of-sight direction calculation performed within a recent certain period. Then, the controller 11 determines whether the track of the line of sight corresponds to a specific movement pattern such as a double take or not. For example, in a case where the driver of the vehicle 10 looks at solely a target to be watched by the driver of the vehicle 10 such as a specific area of a windshield of the vehicle 10, a door mirror, a back mirror, an instrument panel, or a navigation screen for a certain period and the driver suddenly looks at a side glass of the vehicle 10, it is possible to determine that the driver of the vehicle 10 has performed a double take. The double take is a driver's behavior of looking at a target again to see the target once more since the driver has overlooked the target when the target has entered the field of vision of the driver for a first time. Therefore, determination on whether the driver of the vehicle 10 has performed a double take or not corresponds to determination on whether the driver of the vehicle 10 has overlooked a target or not.

When the controller 11 determines whether the driver of the vehicle 10 has overlooked a target or not, bio-information such as the heartbeat, the blood pressure, the pulse pressure, the ventilation volume, the brain waves, the movement of the eyes, the body temperature, or sweating of the driver of the vehicle 10 may be used as supplementary information. In this case, the controller 11 acquires the bio-information of the driver of the vehicle 10 via a bio-sensor provided in the vehicle 10. The controller 11 analyzes the acquired bio-information to determine whether the driver of the vehicle 10 is feeling impatience due to a fact that the driver has overlooked a target present outside the vehicle 10 during driving. In a case where the track of the line of sight corresponds to the specific movement pattern and the controller 11 determines that the driver is feeling impatience, the controller 11 determines that the driver has overlooked a target.

When the controller 11 determines whether the driver of the vehicle 10 has overlooked a target or not, the controller 11 may confirm whether some target has been overlooked actually or not with the driver of the vehicle 10 via the output unit 17. In addition, the controller 11 may receive a reply from the driver of the vehicle 10 via the input unit 16. In a case where a reply that no target has been overlooked actually is received, the controller 11 determines that there is no target overlooked by the driver of the vehicle 10. Accordingly, it is possible to avoid erroneous event detection. The confirmation and the reply about whether some target has been overlooked actually or not may be made by displaying a button on a touch screen and pressing the button and may be made by means of a voice.

The controller 11 may detect the event based on an input operation of the driver performed in the vehicle 10 instead of detecting the event from the image including the driver of the vehicle 10 captured in the vehicle 10. In this case, the controller 11 receives an operation from the driver of the vehicle 10 via the input unit 16, the operation notifying the controller 11 that the driver of the vehicle 10 has overlooked a target present outside the vehicle 10 during driving. The operation may be an operation of pressing a button on the touch screen or a voice input operation.

The processes in step S101 and step S102 are repeatedly performed until the event is detected by the controller 11. In a case where the event is detected by the controller 11, processes in step S103 and subsequent steps are performed.

In step S103, the controller 11 acquires the target image 41. The target image 41 is an image including the target overlooked in the event detected by the controller 11 in step S102.

Specifically, the controller 11 acquires, as the target image 41, an image in a direction in which the overlooked target is likely to be present such as an image in a lateral direction from the vehicle 10, an image in the line-of-sight direction calculated in step S102, and an image in a direction rearward of the line-of-sight direction, from the imaging unit 15. An imaging range may be appropriately adjusted such that the overlooked target is reliably included in the target image 41. The controller 11 stores the acquired target image 41 in the storage unit 12.

When the imaging unit 15 captures the target image 41 from the vehicle 10, the imaging unit 15 may be controlled by the controller 11 such that the imaging unit 15 selects a lateral direction from the vehicle 10 from among a plurality of imaging directions such as a frontward direction, a lateral direction, and a rearward direction from the vehicle 10. Alternatively, when the imaging unit 15 captures the target image 41 from the vehicle 10, the imaging unit 15 may be controlled by the controller 11 such that the imaging unit 15 automatically adjusts the imaging direction such that the imaging direction substantially coincides with the line-of-sight direction calculated in step S102 or the direction rearward of the line-of-sight direction.

The controller 11 may perform processing such as cutting, enlargement or reduction, or resolution change or the like with respect to the target image 41 acquired from the imaging unit 15 and store the target image 41 subjected to the processing in the storage unit 12.

In the present embodiment, the target image 41 is an image that is captured from the vehicle 10 due to a command from the controller 11 when the controller 11 detects the event. However, the target image 41 may be an image that is captured from the vehicle 10 before the event is detected by the controller 11. In this case, the imaging unit 15 continuously captures a moving image at least in the lateral direction from the vehicle 10 or intermittently captures stationary images at least in the lateral direction from the vehicle 10 while the vehicle 10 is traveling. The controller 11 sequentially acquires the captured images from the imaging unit 15. The controller 11 sequentially stores the acquired images in the storage unit 12. In a case where the controller 11 detects the event in step S102, the controller 11 specifies an image acquired within a certain period immediately before the detection of the event as the target image 41.

In step S104, the controller 11 controls the outputting of the target image 41, which is acquired in step S103, toward the driver of the vehicle 10. In the operation in FIG. 3, the controller 11 controls the output unit 17 of the vehicle 10 such that the target image 41 is displayed toward the driver of the vehicle 10.

Specifically, the controller 11 inputs the target image 41 stored in the storage unit 12 to the output unit 17. A vehicle-mounted display included in the output unit 17 displays the target image 41 input from the controller 11 toward the driver of the vehicle 10.

The target image 41 may be displayed at solely a time when the speed of the vehicle 10 is lower than a specified value such as a time when the vehicle 10 is stopped such that safe driving is not interfered with.

Figure 4:
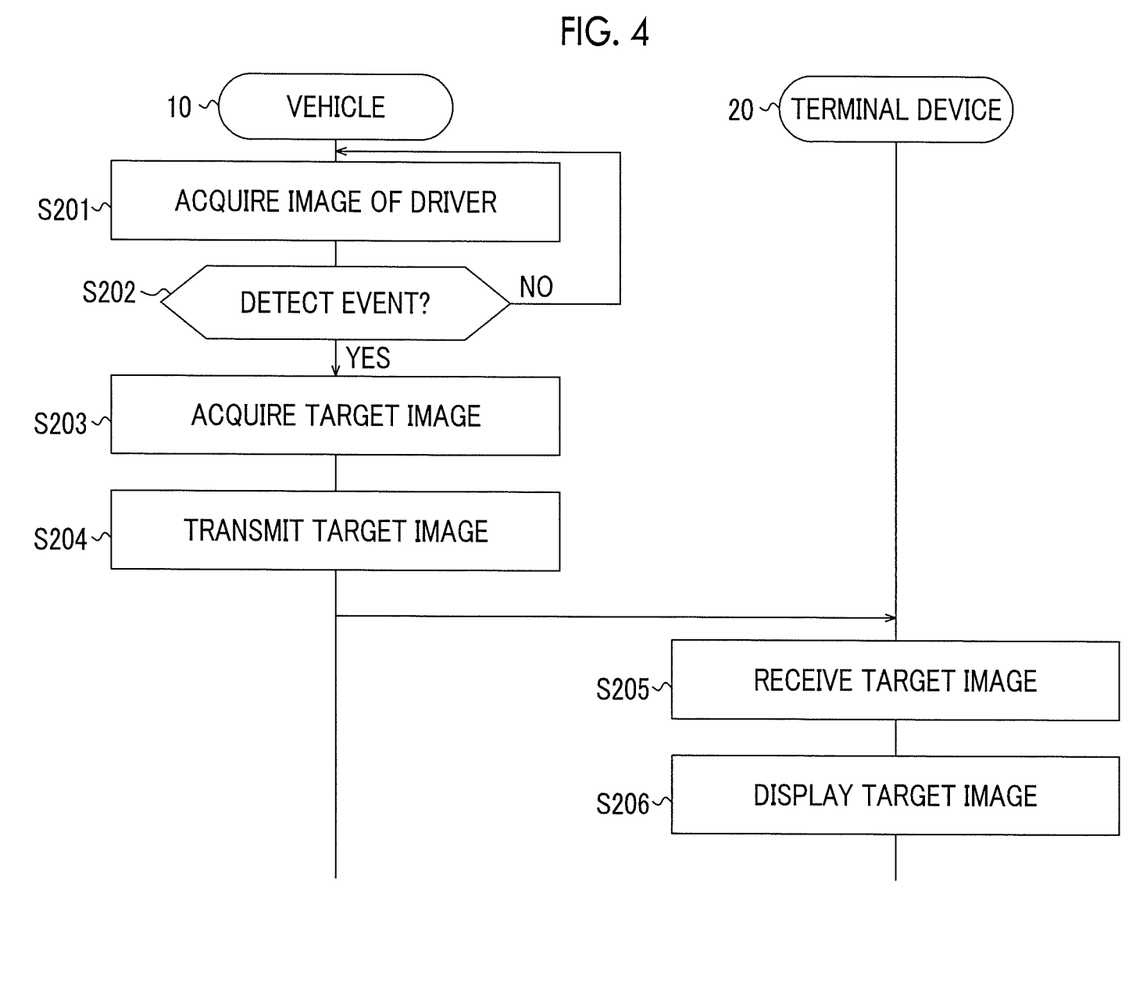
FIG. 4 is a flowchart illustrating an operation of the image display system according to the embodiment of the present disclosure.

FIG. 4 illustrates the operation of the image display system 30 in a case where the terminal device 20 displays the target image 41.

The processes in step S201 to step S204 are performed in the vehicle 10.

The processes in step S201 to step S203 are the same as the processes in step S101 to step S103 and thus description thereof will be omitted.

In step S204, the controller 11 of the control device 31 controls the outputting of the target image 41, which is acquired in step S203, toward the driver of the vehicle 10. In the operation in FIG. 4, the controller 11 controls the communication unit 13 such that the target image 41 is transmitted to the terminal device 20 of the driver of the vehicle 10.

Specifically, the controller 11 inputs the target image 41 stored in the storage unit 12 to the communication unit 13. The communication unit 13 transmits the target image 41, which is input from the controller 11, to the terminal device 20 through communication performed via the network 32.

Processes in step S205 and step S206 are performed in the terminal device 20.

In step S205, the communication unit 23 of the terminal device 20 receives the target image 41 transmitted from the control device 31 of the vehicle 10.

Specifically, the communication unit 23 receives the target image 41, which is transmitted from the control device 31 of the vehicle 10, through communication performed via the network 32. The controller 21 acquires, from the communication unit 23, the target image 41 received from the communication unit 23. The controller 21 stores the acquired target image 41 in the storage unit 22.

In step S206, the controller 21 of the terminal device 20 controls the output unit 26 such that the target image 41 acquired in step S205 is displayed toward the driver of the vehicle 10.

Specifically, the controller 21 inputs the target image 41 stored in the storage unit 22 to the output unit 26. A display included in the output unit 26 displays the target image 41 input from the controller 21 toward the driver of the vehicle 10.

In step S204, the communication unit 13 of the control device 31 of the vehicle 10 may upload the target image 41 to a server belonging to a cloud computing system or another computing system. In this case, in step S205, the communication unit 23 of the terminal device 20 downloads the target image 41 from the server.

As described above, in the present embodiment, the controller 11 of the control device 31 detects, as an event, that a target present outside the vehicle 10 has been overlooked by the driver of the vehicle 10 during driving. The controller 11 controls the outputting of the target image 41, which is an image including the target overlooked in the detected event, toward the driver. Therefore, according to the present embodiment, it is possible for a driver to check later a target overlooked during driving.

For example, when a driver passes by a place such as a store or a fixed object such as a signboard during driving or when the driver and a moving object such as a person or an automobile pass by each other, the driver may notice that the target such as the place, the object, or the person has been overlooked and may perform a double take. In a case where the vehicle 10 is moving forward, the driver cannot check the overlooked target even when the driver performs a double take or the driver can see the overlooked target for a short moment but the driver cannot sufficiently check the target. However, in the present embodiment, the controller 11 of the control device 31 detects a double take performed by the driver and controls the vehicle-mounted display included in the output unit 17 of the vehicle 10 such that the image including the target overlooked by the driver is displayed. Alternatively, the image is transmitted to the terminal device 20 such that the image is displayed on the display included in the output unit 26 of the terminal device 20. Therefore, the driver can check later the target such as the place, the object, or the person overlooked during driving. Therefore, the driver can maintain concentration without being curious about a target overlooked during driving. As a result, the safety of driving is improved.

The control device 31 may be configured as a server belonging to a cloud computing system or another computing system. In this case, the processes in step S101 to step S103 or the processes in step S201 to step S204 are performed in the server. Information needed for the processes in step S101 to step S103 or the processes in step S201 to step S204 such as an image of the driver of the vehicle 10 or the target image 41 may be uploaded to the server from the vehicle 10. The target image 41 may be distributed to the vehicle 10 or the terminal device 20 from the server.

An applicable embodiment of the present disclosure is not limited to the embodiment described above. For example, a plurality of blocks described in a block diagram may be combined with each other or one block may be divided. Instead of performing a plurality of steps described in a flowchart in a chronological order as in the description, the steps may be performed in parallel or in a different order in accordance with the processing capacity of a device performing each step or as needed. Other modifications without departing from the scope of the present disclosure can also be made.

What is claimed is:

1. A control device comprising:
a controller configured to:
detect, as an event, that a target present outside a vehicle has been overlooked by a driver of the vehicle during driving, the event being detected in response to a determination that a driver of the vehicle looks at a side glass of the vehicle away from objects from which the driver was previously viewing, the detection of the event further includes the controller being configured to:
acquire an image of a driver,
determine, from the acquired image, that the driver looks at the side glass to perform a double take of the objects after the driver has viewed the objects for a predetermined period of time,
acquire, after the driver looks at the side glass after viewing the objects for the predetermined period of time, biological information of the driver,
determine, from the biological information, that the driver has an increase in one of a (i) heart rate, (ii) blood pressure, and (iii) breathing rate, and
control outputting of a target image toward the driver, the target image
including the target overlooked in the detected event,
wherein the determination of the performance of the double take of the objects is based on a determination of a line of sight of the driver from the acquired image.

2. The control device according to claim 1, wherein the controller is further configured to control an output unit provided in the vehicle and having a display function such that the target image is displayed toward the driver.

3. The control device according to claim 1, further comprising a communication unit having a communication function, wherein the controller controls the communication unit such that the target image is transmitted to a terminal device of the driver.

4. The control device according to claim 1, wherein the target image is an image captured from the vehicle.

5. The control device according to claim 4, wherein the target image is an image captured from the vehicle before the event is detected by the controller.

6. The control device according to claim 1, wherein the acquired image of the driver is captured in the vehicle.

7. The control device according to claim 1, wherein the controller is further configured to detect the event based on an input operation of the driver performed in the vehicle.

8. A vehicle comprising:
an imaging unit configured to capture a target image; and
the control device according to claim 1.

9. The vehicle according to claim 8, further comprising an output unit configured to display the target image toward the driver.

10. An image display system comprising:
the control device according to claim 1; and
a terminal device configured to receive the target image from the control device and display the target image toward the driver.

11. An image display method comprising:
detecting, as an event by a control device, that a target present outside a vehicle has been overlooked by a driver of the vehicle during driving, the event being detected in response to a determination that a driver of the vehicle looks at a side glass of the vehicle away from objects from which the driver was previously viewing, detecting the event further including:

acquiring an image of a driver, determining, from the acquired image, that the driver looks at the side glass to perform a double take of the objects after the driver has viewed the objects for a predetermined period of time, acquiring, after the driver looks at the side glass after viewing the objects for the predetermined period of time, biological information of the driver, and determining, from the biological information, that the driver has an increase in one of a (i) heart rate, (ii) blood pressure, and (iii) breathing rate;

capturing a target image, which is an image including the target overlooked in the event detected by the control device by an imaging unit of the vehicle; and displaying the target image captured by the imaging unit toward the driver by one of an output unit of the vehicle and a terminal device, wherein the determination of the performance of the double take of the objects is based on a determination of a line of sight of the driver from the acquired image.

* * * * *